US 9,400,494 B2

(12) United States Patent
Mayser et al.

(10) Patent No.: US 9,400,494 B2
(45) Date of Patent: Jul. 26, 2016

(54) COMMUNICATION DEVICE FOR A MOTOR VEHICLE

(71) Applicant: Bayerische Motoren Werke Aktiengesellschaft, Munich (DE)

(72) Inventors: Christoph Mayser, Unterhaching (DE); Andreas Pfeiffer, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 74 days.

(21) Appl. No.: 14/298,281

(22) Filed: Jun. 6, 2014

(65) Prior Publication Data
US 2014/0288786 A1 Sep. 25, 2014

Related U.S. Application Data

(63) Continuation of application No. PCT/EP2012/073090, filed on Nov. 20, 2012.

(30) Foreign Application Priority Data

Dec. 8, 2011 (DE) .......................... 10 2011 088 020

(51) Int. Cl.
*G05B 19/042* (2006.01)
*B60R 16/03* (2006.01)
(Continued)

(52) U.S. Cl.
CPC ........ *G05B 19/0421* (2013.01); *B60R 16/0234* (2013.01); *B60W 50/0205* (2013.01);
(Continued)

(58) Field of Classification Search
CPC . B60W 30/00; B60W 30/02; B60W 30/1886; B60W 2050/0045; B60W 50/00; B60W 2050/0082; B60W 50/085; B60W 50/087; G06F 17/00; G06F 17/30557; B60R 16/023; G08G 1/096725; H02J 1/14; H02J 4/00
See application file for complete search history.

(56) References Cited

U.S. PATENT DOCUMENTS

2006/0235594 A1 10/2006 Knoefler et al.
2013/0241721 A1* 9/2013 Armbrust ................ B60R 16/02
340/435

FOREIGN PATENT DOCUMENTS

| DE | 10 2007 002 887 A1 | 7/2008 |
| EP | 0 989 032 A2 | 3/2000 |
| EP | 2 393 247 A1 | 12/2011 |
| WO | WO 2004/027530 A1 | 4/2004 |

OTHER PUBLICATIONS

International Preliminary Report on Patentability (PCT/IB/326 & PCT/IB/373), including English translation of Written Opinion (PCT/ISA/237) dated Jun. 19, 2014 (seven (7) pages).

(Continued)

*Primary Examiner* — James Trammell
*Assistant Examiner* — Demetra Smith-Stewart
(74) *Attorney, Agent, or Firm* — Crowell & Moring LLP

(57) ABSTRACT

A communication device for a motor vehicle includes a first control unit (BDC), a second control unit (SAS), a control unit arrangement (SGA), a first data bus (SB), to which the first control unit (BDC) and the control unit arrangement (SGA) are connected for the exchange of data, as well as a second data bus (AB), to which the second control unit (SAS) and the control unit arrangement (SGA) are connected for the exchange of data. The control unit arrangement includes at least a first sensor control unit (SSG1) for controlling a first sensor and a second sensor control unit (SSG2) for controlling a second sensor. The first and the second sensor have mutually overlapping sensor acquisition ranges. The first and the second sensor control unit can exchange at least preprocessed sensor data by way of a third data bus (PB). The first and the second sensor control unit are constructed to be operated in a master-slave operation with respect to at least one functionality. By way of the first sensor control unit as the master of a first functionality (F1), first data (DFC), which are provided by the first control unit at the first data bus, are processed for the control unit arrangement. By way of the second sensor control unit as the master of a second functionality (F2), first application data (AD1) for the second control unit are provided at the second data bus.

13 Claims, 5 Drawing Sheets

(51) Int. Cl.
*B60R 16/023* (2006.01)
*B60W 50/02* (2012.01)
*B60R 16/00* (2006.01)
*B60W 50/00* (2006.01)

(52) U.S. Cl.
CPC ......... *B60R16/00* (2013.01); *B60W 2050/0005* (2013.01); *B60W 2050/0006* (2013.01); *B60W 2050/0045* (2013.01)

(56) References Cited

OTHER PUBLICATIONS

German Search Report dated Jul. 20, 2012, with English translation (Ten (10) pages).
International Search Report (PCT/ISA/210) dated Mar. 12, 2013, with English translation (Five (5) pages).

* cited by examiner

COMMUNICATION DEVICE FOR A MOTOR VEHICLE

CROSS REFERENCE TO RELATED APPLICATIONS

This application is a continuation of PCT International Application No. PCT/EP2012/073090, filed Nov. 20, 2012, which claims priority under 35 U.S.C. §119 from German Patent Application No. 10 2011 088 020.8, filed Dec. 8, 2011, the entire disclosures of which are herein expressly incorporated by reference.

BACKGROUND AND SUMMARY OF THE INVENTION

The invention relates to a communication device for a motor vehicle having several control units, which are connected to a data bus for the exchange of data. In particular, the invention relates to a communication device for a driver assistance system in a motor vehicle.

In driver assistance systems of a motor vehicle sensors are used which provide information concerning the vehicle surroundings. Such driver assistance systems are, for example, a lane change assistant or a bottleneck assistant. The latter requires the monitoring of both sides of the vehicle. As a rule, pairs of sensors are used for this purpose, which each monitor one side of the vehicle by sensing. For a lane change assistant, the sensors are, for example, in each case, mounted laterally at the rear of the vehicle. In this case, their monitoring ranges will partially overlap.

The sensors are connected with respective sensor control units which process the sensor data acquired by the sensors. Typically, one of the two sensor control units, as the master, transmits the information, such as detected objects or areas, which can be traveled without collisions, (also called free spaces), present in both sensor control units, by way of a data bus to at least one additional control unit. The sensor control unit operating as the master communicates with the other sensor control unit, which operates as a slave, by way of an internal data bus in order to exchange, for example, raw sensor data or data concerning the inherent movement of the vehicle. By mutually linking the two sensor control units, the sensor pair can provide more exact information concerning recognized objects or free spaces than when the data acquired individually by a respective sensor are individually provided to the data bus.

Such a communication device is schematically illustrated in FIG. 1. The sensor control unit operating as the master is marked SSG1; the sensor control unit operating as a slave is marked SSG2. The sensor control units SSG1 and SSG2 are mutually connected by way of an internal data bus PB for the exchange of data. Each of the two sensor control units SSG1, SSG2 is connected with a respective sensor not shown in detail, which, in particular, have mutually overlapping sensor acquisition ranges and are arranged, for example, at the rear or the front of a vehicle. The sensor data acquired by the sensors are transmitted to each of the sensor control units SSG1, SSG2 for further processing. Furthermore, the sensor control units SSG1, SSG2 are also used for the controlling, for example, the configuration, of the respective sensors. Together, the sensor control units SSG1, SSG2 form a control unit arrangement SGA, which is connected by way of a data bus SB with a control unit BDC of the motor vehicle. Actually, the physical connection exists only between the control unit SSG1 operating as the master and the control unit BDC. The control unit BDC may, for example, be a central control unit of the motor vehicle.

By way of the data bus SB, data DFC are provided to the control unit arrangement SGA by the control unit BDC, which, within the scope of a functionality F1, concern a diagnosis of the control unit arrangement SGA and/or of the sensors connected to the latter, a coding or a programming (flashing). The corresponding functionality F1 is taken over by the sensor control unit SSG1 operating as the master ("master diagnosis"). The same applies to the implementation of a calibration, which represents a functionality F3. For this purpose, the sensor control unit SSG1 operating as the a master provides calibrating data KD to the sensor control unit SSG2 operating as a slave. It is to be ensured thereby that the overlapping range implemented by the two sensors is defined.

Within the scope of its function as master for the control unit arrangement SGA, the sensor control unit SSG1 receives unprocessed or preprocessed sensor data $OS_{2 \to 1}$ from the control unit SSG2 operating as the slave, in order to process these data by means of a functionality F2 with the own sensor data and transmit a result of the processing as application data AD2 of the control unit arrangement SGA by way of the data bus to the control unit BDC.

In order to permit a preprocessing of the sensor data, as a rule, also odometric data of the vehicle, i.e. data concerning the inherent movement of the vehicle relative to its surroundings, are required. The control unit arrangement SGA receives corresponding data FDD ("driving dynamics data) from the control unit BDC. These data are received by the sensor control unit SSG1 operating as the master and are transmitted by way of a gateway $GW_{FDD}$ to the sensor control unit SSG2. Odometric data ("driving dynamics data") are therefore present in each of the sensor control units SSG1, SSG2, so that the corresponding sensor data can in each case be related to them. The data preprocessed to object data $OS_{2 \to 1}$ by the sensor control unit SSG2 can then be processed by the sensor control unit SSG1 to form overall information.

FIG. 1 further illustrates an additional control unit SAS which is coupled by way of an additional data bus DB with the control unit BDC for the exchange of data. The control unit SAS represents, for example, a special functionality which requires not only abstracted application data AD2 as made available by the control unit BDC but detailed application data concerning the situation acquired by the sensors. While the application data AD2 contain, for example, only the information that a vehicle is approaching from the left rear relative to the own vehicle, the control unit SAS for providing its functionally requires detailed information concerning the vehicle approaching from the rear, such as the distance to the own vehicle, the relative speed to the own vehicle, etc. Such information can easily be provided by the control unit arrangement. In the topology illustrated in FIG. 1, these expanded application data then have to be transmitted by way of the data bus SB, the control unit BDC, the data bus DB to the control unit SAS. Because of an at least temporarily large volume of the expanded application data, an excessively high data load may occur on the data bus, by which other functionalities could be impaired.

It is an object of the present invention to provide a communication device as well as a method for operating a communication device which avoids the occurrence of an excessive bus load.

This object is achieved by a communication device according to the invention as well as by a method according to the invention.

The invention provides a communication device for a motor vehicle. The communication device comprises a first control unit, a second control unit and a control unit arrangement. Furthermore, a first data bus is provided to which the first control unit and the control unit arrangement are connected for the exchange of data. The second control unit and the control unit arrangement are connected to a second data bus for the exchange of data. The control unit arrangement comprises at least a first sensor control unit for controlling a first sensor and a second sensor control unit for controlling a second sensor. The first and the second sensor have mutually overlapping sensor acquisition ranges. By way of a third data bus, the first and the second sensor control unit can exchange at least preprocessed sensor data. The first and the second sensor control unit are designed to be operated in a master-slave operation with respect to at least one functionality. In this case, by way of the first sensor control unit as a master of a first functionality, first data, which are provided at the first data bus by the first control unit, are processed for the control unit arrangement. By way of the second sensor control unit as the master of a second functionality, first application data for the second control unit are provided at the second data bus.

The invention further provides a method for operating a communication device for a motor vehicle. The communication device comprises a first control unit, a second control unit and a control unit arrangement which comprises at least a first sensor control unit for controlling a first sensor and a second sensor control unit for controlling a second sensor, the first and the second sensor having mutually overlapping sensor acquisition ranges. A first data bus is further provided to which the first control unit and the control unit arrangement are connected for the exchange of data. The second control unit and the control unit arrangement are connected to a second data bus for the exchange of data. In the case of the method according to the invention, the first and the second sensor control unit exchange at least preprocessed sensor data by way of a third data bus. The first and the second sensor control unit are operated in a master-slave operation with respect to at least one functionality, whereby, by way of the first sensor control unit as the master of a first functionality first data, which are provided by the first control unit at the first data bus, are processed for the control unit arrangement, and whereby, by way of the second sensor control unit as the master of second functionality first application data for the second control unit are provided at the second data bus.

As a result of the communication device according to the invention, the technical complexity of the communication device and higher costs because of specific components are avoided in that the sensor control units of the control unit arrangement are operated depending on the functionality in a different master-slave configuration. This particularly results in the advantage that the first data bus connecting the first control unit and the control unit arrangement does not have to carry an excessively high bus load. This is a result of the fact that the data-intensive first application data are provided by the second sensor control unit operated as a master, which sensor control unit is not connected to the first data bus. The communication device according to the invention can be obtained in that the different functionalities of the control unit arrangement do not occur simultaneously, whereby the flexible defining of master and slave can be controlled by way of the corresponding providing of the functionality in each of the sensor control units.

In an expedient further development, the first data of the first functionality include data concerning the maintenance and/or diagnosis of the control unit arrangement.

In contrast, the second functionality includes the preprocessing of measuring data acquired by the first and the second sensor, the preprocessed measuring data being provided as first application data, which include objects acquired by the sensors and the information concerning the position and/or movement relative to the first and second sensor. The first application data thereby include processed raw data of the sensors, in which case, these are generated by processing and/or combining the respective sensor data. The first application data include, for example, information concerning all objects detected by the sensors. Objects represent a collection of reflection points which can be combined to form a unit. Such a unit may then, for example, correspond to a vehicle, a motorcycle, a pedestrian, a bicyclist, etc. The combination of all detected objects of the two sensor control units is called a "fusion", wherein the data of the fusion correspond to the first application data. On the basis of these detailed first application data, the second control unit may, for example, provide a functionality intended for a driver assistance system.

According to a further development, the second functionality includes the processing of measuring data acquired by the first and the second sensor, whereby a result of the processing is made available as second application data by way of the first sensor control unit as a slave to the first data bus for the processing by the first control unit. The second application data therefore include only abstracted information, which is determined from the sensor data. The second application data include, for example, only abstract information, such as "vehicle from the left rear", "vehicle from the right rear", etc. Such abstracted information can be transmitted with a small bandwidth from the control unit arrangement, particularly the first sensor control unit connected with the first data bus to the first control unit for further processing.

Accordingly, the first application data may have a greater data volume, particularly a volume several times larger, compared to the second application data. The second application data are reduced to an abstract level, for example, by a reduction of the fusion data or of the first application data. In this specification, such first application data are also called a "warning".

In an advantageous further development, sensor data of the first sensor are provided to the second sensor control unit as the master of the second functionality by the first sensor control unit for processing. The master of the second functionality is capable of determining the first as well as the second application data from these sensor data. As explained above, the providing of the extensive first application data takes place by the sensor control unit, which operates as the master of the second functionality. The providing of the second application data which are comparatively fewer takes place by the sensor control unit operating as the slave in that the corresponding data are transmitted by way of the third data bus first within the control unit arrangement.

According to a further advantageous embodiment, data required for an odometry computation are provided to the second sensor control unit as the master of the second functionality by the first sensor control unit for processing, which data are provided by the first control unit at the first data bus. The transmission of the data required for the odometry computation within the control unit arrangement, in turn, takes place by way of the third data bus.

In a further advantageous embodiment, calibrating data are provided by the second sensor control unit as the master of a third functionality to the first sensor control unit as the slave. A calibration is required in order to adapt the acquisition range of the two sensors to one another in a defined manner.

Also with respect to this functionality, one of the two units takes over the function of the master while the other has the function of the slave.

The first sensor control unit and the second sensor control unit each have two bus connections. In particular, the first sensor control unit and the second sensor control unit may be of an identical construction with respect to their hardware. This leads to savings of production costs because different sensor control units do not have to be provided. The same applies to the storage or control during working processes. Which of the sensor control units then becomes the master and which becomes the slave with respect to a functionality will be defined solely by the corresponding software of the concerned sensor control unit. As explained above, the different functionalities cannot occur simultaneously, so that the flexible defining of master and slave can be adjusted by way of the corresponding software of the sensor control units.

The first and the second sensor form a pair of sensors, whose sensors are, for example, optical sensors or radar sensors.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
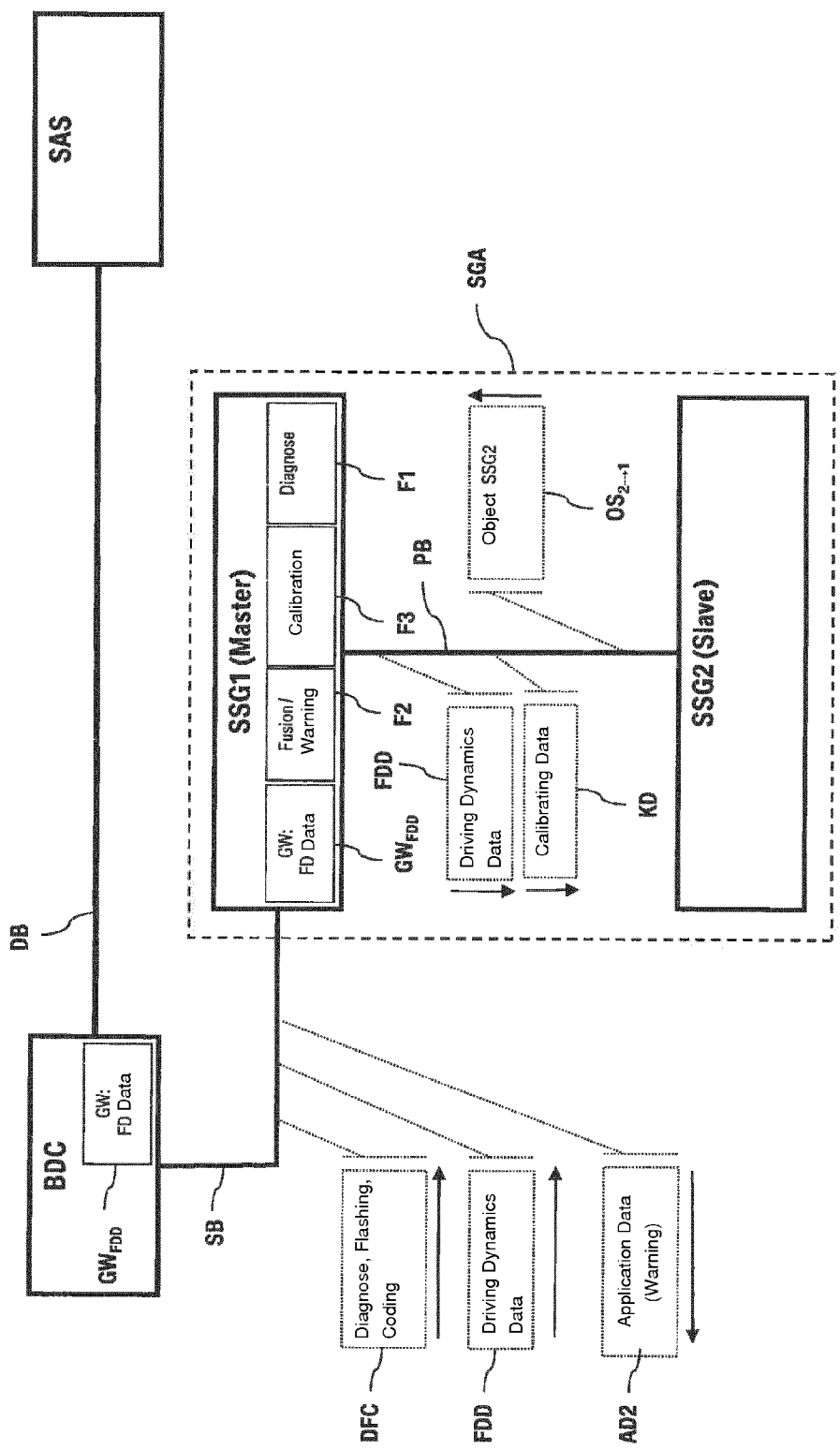
FIG. 1 is a schematic block diagram representation of a known communication device, in which all data are transmitted from and to a control unit arrangement by way of a single data bus.

In the embodiments described in the following, the components described in connection with FIG. 1 will be shown in different interconnections. The same components are provided with identical reference numbers. In the figures, data exchanged between the individual components are shown by small boxes framed by dotted lines. The respectively assigned arrow indicates the direction of the communication by way of the corresponding data bus.

The communication devices according to FIGS. 2 to 5 described in the following each include a control unit arrangement SGA, a first control unit BDC as well as a second control unit SAS. The first control unit BDC and the control unit arrangement SGA are connected to a first data bus SB for the exchange of data. The second control unit SAS and the control unit arrangement SGA are connected to a second data bus AB for the exchange of data. The control unit arrangement SGA includes at least a first sensor control unit SSG1 for controlling a first sensor (not shown in detail) and a second sensor control unit SSG2 for controlling a second sensor (also not shown). The first and the second sensor control units SSG1, SSG2 of the control unit arrangement SGA can exchange data by way of a third data bus PB. Furthermore, an additional fourth data bus DB is illustrated which is used for the exchange of data between the first control unit BDC and the second control unit SAS.

The first and the second sensor form a pair of sensors, which pair is arranged, for example, at the rear of a vehicle with a mutually overlapping sensor acquisition range. The sensors may be optical sensors or radar sensors, in order to detect the approach of another vehicle or other object toward the own vehicle. Such a sensor arrangement is used particularly for a driver assistance system, for example, as a lane change assistant or a bottleneck assistant. In an alternative embodiment, the arrangement of the sensors could also be at the front of the vehicle or at the left side or the right side. Likewise, several pairs of sensors could be provided on a vehicle, which are connected or controlled as described in the following. The arrangement of the sensors depends essentially on the functionality of the driver assistance system to be implemented. As a rule, the first and the second sensor are arranged at the vehicle such that they have mutually overlapping sensor acquisition ranges.

The first control unit BDC, for example, represents a central control unit of the motor vehicle. It is understood that the first control unit does not have to be designed as the only control unit but may include any plurality of control units which can exchange data by way of one or more data buses or other data connections.

The second control unit SAS represents, for example, a selected control unit, which is used for providing a specific driver assistance functionality. The second control unit SAS will be provided in the vehicle, for example, only when a customer has ordered it within the framework of optional equipment. In contrast, the first control unit BDC and the control unit arrangement SGA are already present in a variant of the motor vehicle, in which a driver assistance system is provided that has a lower simpler functionality. In the further description, it is assumed that the simple functionality provided by the first control unit BDC is a lane change assistant. The second control unit SAS is a variant of a lane change assistant which is optimized with respect to the latter and for which much more detailed information has to be provided.

As initially explained, when the second control unit SAS is present, a large volume of data will occur, which is provided by the control unit arrangement SGA and has to be transmitted to the second control unit SAS for further processing.

Figure 2:
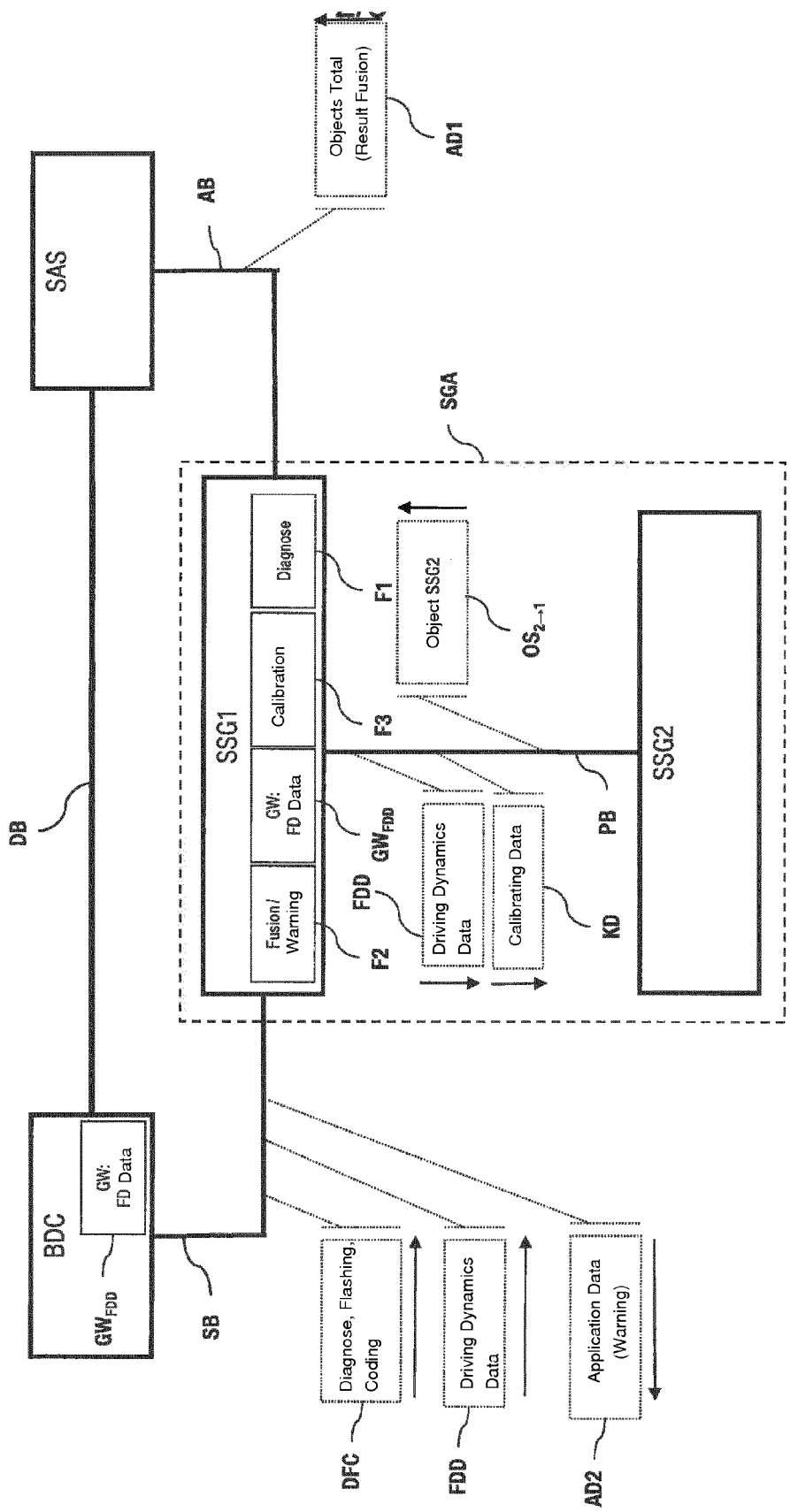
FIG. 2 is a schematic block diagram representation of a communication device, in which a data transmission takes place from and to a control unit arrangement by way of two data buses according to an embodiment of the invention.

In order not to let the bus load by way of the first data bus SB, which, for example, represents a system bus of the communication device, rise to unacceptable values, the variant illustrated in FIG. 2 provides the forming of the second data bus AB between the second control unit SAS and the first sensor control unit SSG1 of the control unit arrangement SGA. In particular, first application data AD1 are transmitted by way of the second data bus AB. The first application data AD1 comprise the result of a data fusion, i.e. the combination of all objects which consist of a selection of reflection points, which are combined of the sensor data of the first and second sensor for forming a unit. In this case, an object corresponds, for example, to a detected motor vehicle, motorcycle, a pedestrian or a bicyclist. By means of the fusion, those data are transmitted within the scope of the first application data AD1 to the second control unit SAS which permit the control unit SAS to determine the individual objects with respect to the position, speed and/or additional parameters relative to the own vehicle. The second control unit SAS will be able to provide a lane change assistant with an expanded functionality from this plurality of information.

A lane change assistant with an expanded functionality can be differentiated, for example, by means of the considered input variable and/or by way of the further development of the feedback to the driver. Thus, for example, the lane change assistant can draw the driver's attention by use of an optical display to the situation "vehicle is approaching from the rear in adjacent lane" and, as required, additionally switch to a vibration at the steering wheel, if the driver wants to steer his own vehicle into the adjacent lane. An "expanded lane change assistant" may, in addition to the danger source "vehicle is approaching from the rear in adjacent lane", use additional input variables, such as, for example, existing lane markings or constructional separations, like guardrails, and thereby warn the driver on the whole of collisions in the side area. The feedback to the driver may be more specifically pronounced by way of the application of a steering torque. Should a steering torque be used as a feedback, it is necessary to know the precise lateral distance between the own vehicle and the "critical" object in order to generate the torque relative to this distance.

In contrast, a lane change assistant with a simple functionality would comprise a mere warning, for example, in the form of a flashing light or a notice in a control display that an object is in the danger zone.

The fusion of the sensor data provided by the first and the second sensor and the preprocessing is carried out by a second functionality F2, which is implemented in the first sensor control unit SSG1. For this purpose, object data $OS_{2 \rightarrow 1}$ are provided to the first sensor control unit SSG1 by the second control unit SSG2. The object data include preprocessed sensor data of the second sensor, in which case the preprocessing includes the taking into account of vehicle dynamics data FDD which are made available to the control unit arrangement SGA at the first sensor control unit SSG1 by the first control unit BDC. For the forwarding of the driving dynamics data FDD required for the odometry computation to the second sensor control unit SSG2, a gateway $GW_{FDD}$ is provided in the first sensor control unit SSG1.

Within the scope of the functionality F2, not only the first application data AD1 are transmitted by way of the second data bus AB to the second control unit SAS; rather, within the scope of the functionality F2, information is also generated which represents a warning and is transmitted as second application data AD2 by way of the first data bus SB for processing to the first control unit BDC. The second application data AD2 include fusion data reduced to an abstract level, such as "a vehicle is approaching from the left rear." The second application data AD2 therefore include no detailed information concerning the position and/or speed of one or more detected objects. For this reason, the amount of the second application data AD2 is considerably smaller than that of the first application data AD1.

With respect to the second functionality F2, the first sensor control unit SSG1 operates as the master, while the second sensor control unit SSG2 represents the slave. This division (SSG1 as the master and SSG2 as the slave) is also provided with respect to further functionalities F1 and F3. Within the scope of the functionality F1, a diagnosis of the control unit arrangement takes place. For this purpose, the first sensor control unit SSG1 receives data DFC from the first control unit BDC by way of the data bus SB, which data concern a diagnosis, a coding or a programming (flashing) of the control unit arrangement. When, for example, a diagnosis is to be carried out, the first sensor control unit SSG1 retrieves required data from the second sensor control unit SSG2 and transmits the result to the first control unit BDC. The same approach takes place during a coding or programming.

A calibration within the scope of the third functionality F3 is also carried out under the overall control of the first control unit SSG1. For this purpose, calibrating data KD are transmitted from the first sensor control unit SSG1 to the second control unit SSG2 by way of the third data bus DB. A calibration is, for example, required when the alignment of the sensor acquisition ranges of the two sensors with respect to one another deviates beyond a specified measurement.

The topology illustrated in FIG. 2 permits a relieving of the first data bus SB because the data-intensive application data AD1 are transmitted by way of the second data bus AB directly to the second control unit SAS. However, this variant requires the providing of a third bus connection at the sensor control unit SSG1 operating as a master, whereby the implementation becomes relatively expensive.

Figure 3:
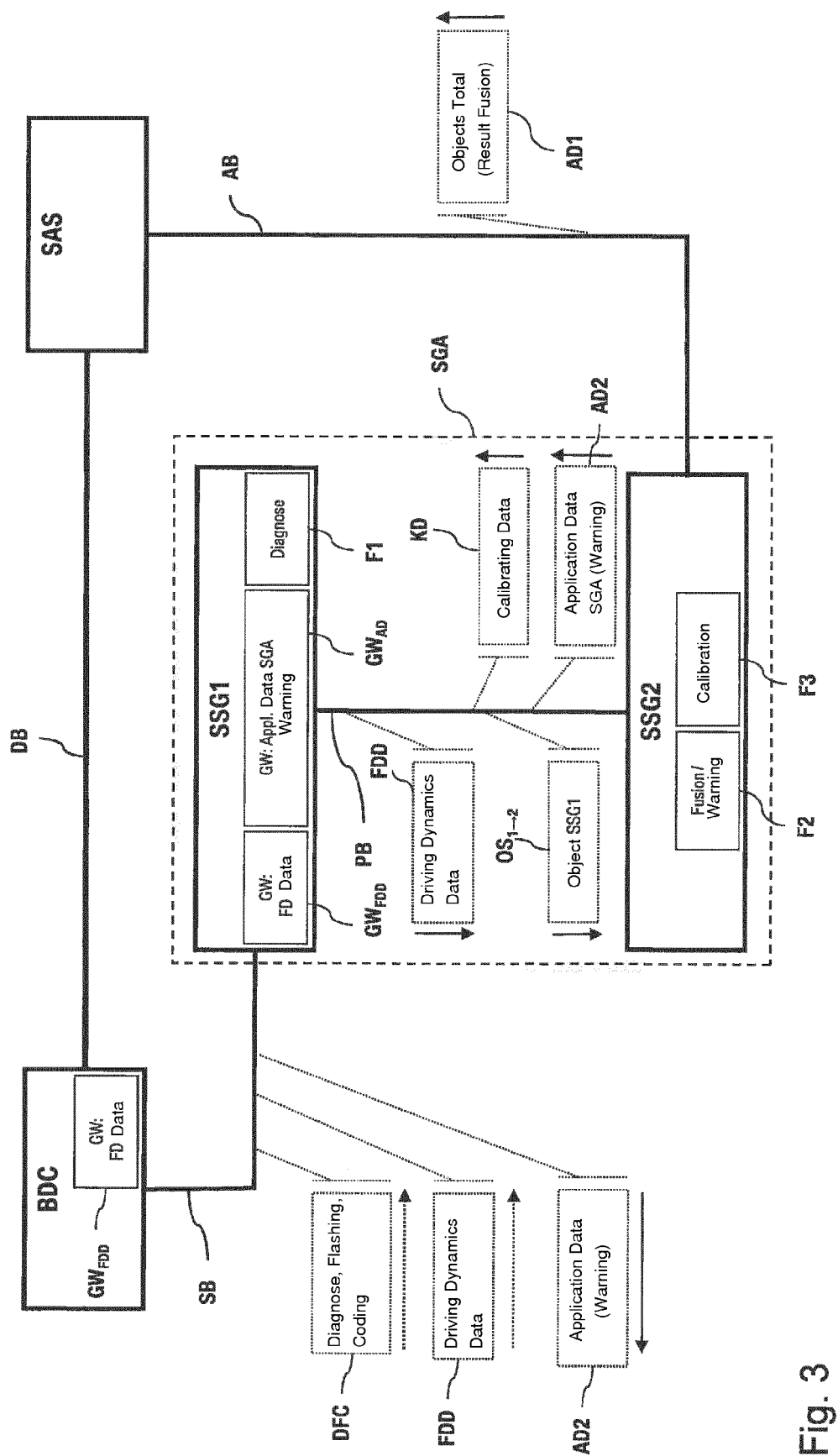
FIG. 3 is a schematic block diagram representation of a communication device according to an embodiment of the invention with an optimized data load and reduced technical complexity.

A preferred implementation of a communication device according to the invention is illustrated in FIG. 3. In the case of this communication device, the second data bus AB is provided between the second control unit SAS and the second sensor control unit SSG2. It thereby becomes possible to provide the first and the second sensor control unit SSG1, SSG2 with two bus connections respectively. Thus, the first sensor control unit SSG1 has a bus connection for the first data bus SB and the third data bus PB. The second sensor control unit SSG2 has a connection for the third data bus PB and the second data bus AB. In this variant, it is possible to construct the sensor control units SSG1, SSG2 as common parts with respect to their hardware.

In order to be able to ensure the above-described functionality, the functionalities F1, F2, F3 are distributed in a different manner to the two sensor control units SSG1 and SSG2. In the case of the first functionality F1, by which a diagnosis of the control unit arrangement SGA can be carried out, the first sensor control unit SSG1 represents the master and the second sensor control unit SSG2 represents the slave.

With respect to the second functionality F2, in which a detailed and abstracted processing of the data provided by the sensors takes place (i.e. a determination of the first and the second application data AD1 and AD2), however, the second sensor control unit SSG2 represents the master and the first sensor control unit SSG1 represents the slave. This has the result that now object data $OS_{1 \rightarrow 2}$, together with the driving dynamics data FDD required for the odometry computation, are provided to the second sensor control unit SSG2 by the first sensor control unit SSG1.

The object data $OS_{1 \rightarrow 2}$ include sensor data of the first sensor preprocessed with the driving dynamics data FDD. The first application data AD1 determined by the second sensor control unit SSG2 from the object data $OS_{1 \rightarrow 2}$ and the sensor data of the second sensor preprocessed with the driving dynamics data are transmitted directly by way of the second data bus AB to the second control unit SAS. The second application data AD2, which only contain an abstracted form (i.e. a warning), are transmitted from the second sensor control unit SSG2 to the first control unit SSG1. The latter now includes a further gateway $GW_{AD}$ for the second application data, so that these can be provided to the first control unit BDC by way of the data bus SB.

Likewise, the second sensor control unit SSG2 represents the master for the third functionality F3 for the calibration. The calibrating data KD are therefore now transmitted from the second sensor control unit SSG2 to the first sensor control unit SSG1, which processes and executes the corresponding information.

Since the functionality F1 is never implemented simultaneously with functionalities F2 or F3, a flexible defining of the master and the slave can be carried out by way of the corresponding software of the sensor control units SSG1, SSG2. The two sensor control units SSG1, SSG2 can therefore be equipped with two bus connections respectively and, while the hardware is identical, can in each case be operated by different software. This results in cost savings in the production as well as the storage or control in the working processes because of a double piece number and the elimination of a control unit variant.

Figure 4:
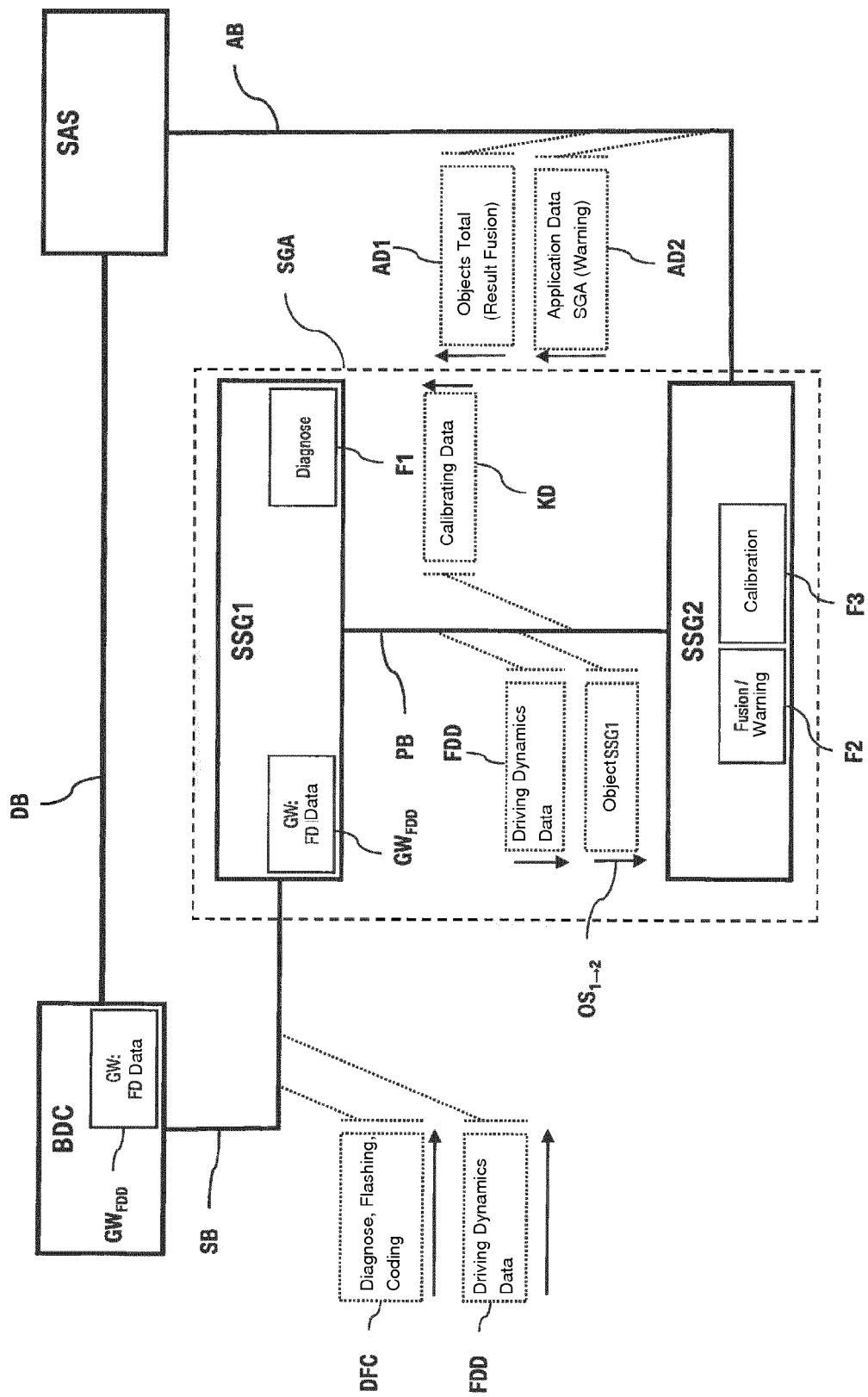
FIG. 4 is a schematic block diagram representation of a first alternative communication device.
Figure 5:
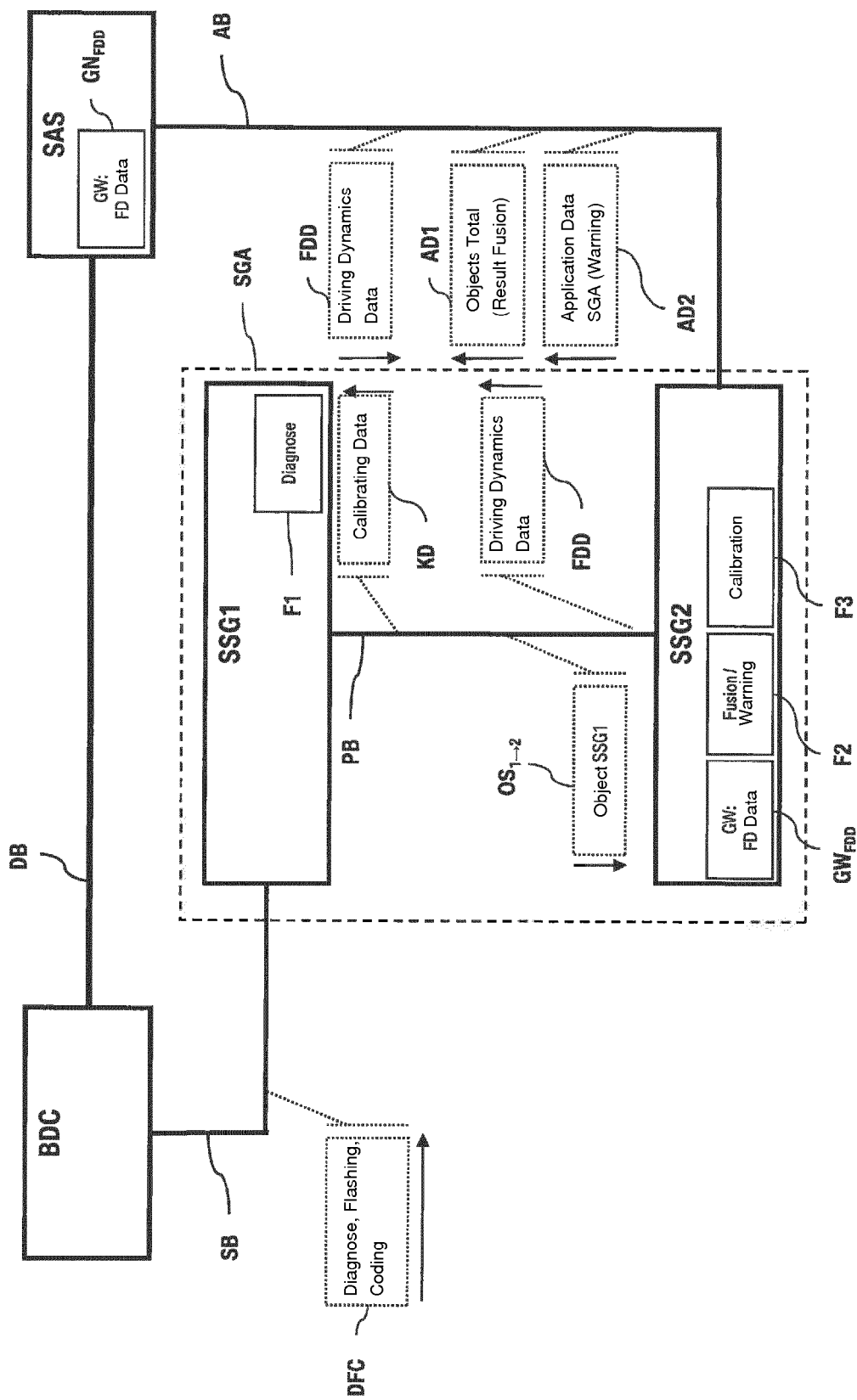
FIG. 5 is a schematic block diagram representation of a second alternative communication device.

The further embodiments illustrated in FIGS. 4 and 5 illustrate additional alternative further developments of a communication device according to the invention. These are based on the topology of the communication device described in connection with FIG. 3.

In the first alternative further development according to FIG. 4, the output of the second application data AD2 does not take place by way of the sensor control unit SSG1 operating as a slave with respect to functionality F2, but by way of the sensor control unit SSG2 operating as a master with respect to F2. Accordingly, the second application AD2 are transmitted by way of the second data bus AB to the second control unit SAS. Likewise, as described in the embodiment according to FIG. 3, the second control unit SAS is the recipient of the first application data AD1. In this variant of the further development, either the simple as well as the expanded functionality of the driver assistance system, such as the lane change assistant, are equally implemented by the second control unit SAS. If this is not desired, the second application data AD2 can be transmitted from the second control unit SAS by way of the first data bus DB, in turn, to the first control unit BDC. As required, a corresponding gateway for the second application data AD2 then also has to be provided in the second control unit SAS.

In the second alternative according to FIG. 5, which is again based on the topology of the communication device described in connection with FIG. 3, analogously to FIG. 4, the first and second application data AD1, AD2 are transmitted from the second sensor control unit SSG2 operating as the master with respect to functionality F2 by way of the second data bus AB to the second control unit SAS. In contrast to the preceding variant according to FIG. 4, however, the driving dynamics data FDD required for the odometry computation are not provided to the sensor control unit SSG1 by way of the first data bus SB. Instead, the driving dynamics data FDD are transmitted from the first control unit BDC to the second control unit SAS, which includes a gateway $GW_{FDD}$ for the forwarding to the second sensor control unit SSG2 by way of the second data bus AB.

In the alternative further developments according to FIGS. 4 and 5, the data load of the system bus SB can be further reduced. On the other hand, further data transmission paths have to be accepted for providing the functionalities, whereby particularly the second data bus AB and the fourth data bus are loaded more.

The communication devices suggested according to the invention permit the providing of a control unit arrangement, in which the sensor control units contained therein are each equipped with two bus connections. These can therefore be provided with identical hardware. Depending on the functionality, one or the other sensor control unit operates as a master, which is defined by the corresponding software in the sensor control units. The technical complexity of the communication device can thereby be reduced.

LIST OF REFERENCE SYMBOLS

BDC First control unit
SAS second control unit
SGA control unit arrangement
SSG1 first sensor control unit
SSG2 second sensor control unit
SB first data bus
AB second data bus
PB third data bus
DB fourth data bus
F1 first functionality
F2 second functionality
F3 third functionality
$GW_{FDD}$ gateway
$GW_{AD}$ gateway
$OS_{1\to2}$ object data which are transmitted from the first to the second sensor control unit
$OS_{2\to1}$ object data which are transmitted from the second to the first sensor control unit
AD1 first application data
AD2 second application data
KD calibrating data
DFC first data
FDD odometry data The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A communication device for a motor vehicle, comprising:
   a first control unit (BDC);
   a second control unit (SAS);
   a control unit arrangement (SGA);
   a first data bus (SB), to which the first control unit (BDC) and the control unit arrangement (SGA) are connected for exchanging data;
   a second data bus (AB), to which the second control unit (SAS) and the control unit arrangement (SGA) are connected for exchanging data,
   wherein
   the control unit arrangement (SGA) comprises at least a first sensor control unit (SSG1) for controlling a first sensor and a second sensor control unit (SSG2) for controlling a second sensor,
   the first and the second sensor have mutually overlapping sensor acquisition ranges,
   the first and the second sensor control unit (SSG1, SSG2) can exchange at least preprocessed sensor data by way of a third data bus (PB),
   the first and the second sensor control unit (SSG1, SSG2) are constructed to be operated in a master-slave operation with respect to at least one functionality, wherein
      by way of the first sensor control unit (SSG1) as the master of a first functionality (F1), first data (DFC), which are provided by the first control unit (BDC) at the first data bus (SB), are processed for the control unit arrangement (SGA), and
      by way of the second sensor control unit (SSG2) as the master of a second functionality (F2), first application data (AD1) for the second control unit (SAS) are provided at the second data bus (AB).

2. The communication device according to claim 1, wherein the first data (DFC) of the first functionality (F1) comprise data concerning one or more of maintenance of the control unit arrangement (SGA) and diagnosis of the control unit arrangement (SGA).

3. The communication device according to claim 2, wherein the second functionality (F2) comprises preprocessing of measuring data acquired by the first and the second sensor, the preprocessed measuring data being provided as first application data (AD1), which comprise objects acquired by the sensors and information concerning one or more of position and movement relative to the first and the second sensor.

4. The communication device according to claim 1, wherein the second functionality (F2) comprises processing of measuring data acquired by the first and the second sensor, the result of the processing being provided as second application data (AD2) by way of the first sensor control unit (SSG1) as the slave at the first data bus (SB) for the processing by control unit (BDC).

5. The communication device according to claim 4, wherein the first application data (AD1) have a larger data volume than the second application data (AD2).

6. The communication device according to claim 5, wherein the first application data are several times larger in data volume than the second application data.

7. The communication device according to claim 1, wherein sensor data of the first sensor are provided to the second sensor control unit (SSG2) as the master of the second functionality (F2) by the first sensor control unit (SSG1) for processing.

8. The communication device according to claim 1, wherein data (FDD) required for an odometry computation are provided for processing to the second sensor control unit (SSG2) as the master of the second functionality (F2) by the first sensor control unit (SSG1), which data are provided by the first control unit (BDC) at the first data bus.

9. The communication device according to claim 1, wherein calibrating data are provided by the second sensor control unit (SSG2) as the master of a third functionality (F3) to the first sensor control unit (SSG1) as the slave.

10. The communication device according to claim 1, wherein the first sensor control unit (SSG1) and the second sensor control unit (SSG2) each have two bus connections.

11. The communication device according to claim 1, wherein the first sensor control unit (SSG1) and the second sensor control unit (SSG2) have an identical hardware construction.

12. The communication device according to claim 1, wherein the first and the second sensor are optical sensors or radar sensors.

13. A method for operating a communication device for a motor vehicle, the method comprising the acts of:
providing a first control unit (BDC);
providing a second control unit (SAS);
providing a control unit arrangement (SGA), which comprises at least a first sensor control unit (SSG1) for controlling a first sensor and a second sensor control unit (SSG2) for controlling a second sensor, the first and the second sensor having mutually overlapping sensor acquisition ranges;
providing a first data bus (SB) to which the first control unit (BDC) and the control unit arrangement (SGA) are connected for exchanging data;
providing a second data bus (AB) to which the second control unit (SAS) and the control unit arrangement (SGA) are connected for exchanging data,
exchanging, via the first and the second sensor control unit (SSG1, SSG2), at least preprocessed sensor data by way of a third data bus (PB);
operating the first and the second sensor control unit (SSG1, SSG2) in a master-slave operation with respect to at least one functionality, wherein
by way of the first sensor control unit (SSG1) as the master of a first functionality, first data (DFC), which are provided by the first control unit (BDC) at the first data bus (SB), are processed for the control unit arrangement (SGA), and
by way of the second sensor control unit (SSG2) as the master of a second functionality, first application data (AD1) for the second control unit (SAS) are provided at the second data bus (AB).

* * * * *